United States Patent [19]

Hallett et al.

[11] Patent Number: 4,887,823
[45] Date of Patent: Dec. 19, 1989

[54] DRAG REDUCING APPARATUS

[75] Inventors: Thomas D. Hallett; Donald H. Bierdeman, both of Fargo, N. Dak.

[73] Assignee: SkiDeer, Inc., Fargo, N. Dak.

[21] Appl. No.: 141,593

[22] Filed: Jan. 7, 1988

[51] Int. Cl.⁴ .............................................. B62B 13/16
[52] U.S. Cl. ........................................ 280/19; 224/921
[58] Field of Search .................... 280/18, 19; 224/103, 224/156, 921, 181, 182, 151

[56] References Cited

U.S. PATENT DOCUMENTS

| | | | |
|---|---|---|---|
| 2,592,771 | 4/1952 | Wampler | 224/5 |
| 2,855,133 | 10/1958 | Mullin | 224/5 |
| 2,931,629 | 4/1960 | Keller | 254/195 |
| 2,996,228 | 8/1961 | Bauman | 224/5 |
| 3,038,644 | 6/1962 | Johnson | 224/219 |
| 3,074,074 | 1/1963 | Lovering | 224/94 |
| 3,077,292 | 4/1963 | Gehrke | 224/5 |
| 3,222,080 | 7/1965 | Kinraide | 280/18 |
| 3,346,154 | 10/1967 | Bishop | 224/5 |
| 4,045,040 | 8/1977 | Fails | 280/1.5 |
| 4,243,164 | 1/1981 | Burlison et al. | 224/52 |
| 4,283,068 | 8/1981 | Keyser | 280/19 |
| 4,298,091 | 11/1981 | Anderson | 182/3 |
| 4,335,891 | 6/1982 | Alley et al. | 280/19 |
| 4,396,091 | 8/1983 | Anderson | 182/3 |
| 4,431,121 | 4/1984 | Bensette | 224/153 |

OTHER PUBLICATIONS

Tyvek®, A Guide to Properties and End Uses (E-643-04-1) (Dupont ©1985).
The Raven Industries Packet (ATD-0058-1/82) (publication date unknown).

Primary Examiner—Charles A. Marmor
Assistant Examiner—Richard Camby
Attorney, Agent, or Firm—Merchant, Gould, Smith, Edell, Welter & Schmidt

[57] ABSTRACT

An apparatus for reducing drag when sliding an animal headfirst along the ground is provided. The drag reducing apparatus comprises a wrapping mechanism for conforming to the shape of the animal. The wrapping mechanism includes a forward edge, a rearward edge, a forward body portion, a central body portion, and a rearward body portion. The forward edge has a substantially smaller lateral dimension than a lateral dimension of the central body portion. The forward body portion is interconnected to the rearward body portion by the central body portion. The wrapping mechanism further includes a first securing mechanism for securing the forward edge around the neck of the animal such that the forward edge remains secured around the neck of the animal when the animal is towed headfirst along the ground. Preferably the wrapping mechanism includes a flexible sheet member and a second securing mechanism for securing the flexible sheet member around the animal. A method of towing an animal headfirst along the ground in the drag reducing apparatus is also provided.

28 Claims, 3 Drawing Sheets

DRAG REDUCING APPARATUS

BACKGROUND OF THE INVENTION

The present invention relates to a method and an apparatus for towing large game, preferably deer, out of inaccessible areas after they have been harvested.

Hunters often travel by foot into wilderness areas to hunt big game such as deer, antelope, moose, elk, sheep, goats, and the like. When the animals have been killed, there is often a need to pull the animals out of these wilderness areas because these areas are often inaccessible to vehicles, either because of the terrain, or because of heavy forrestation. In such situations, the game is generally dressed out, or eviscerated, in the field, and then towed to a road where a vehicle may be brought in in order to transport the carcass out of the area. Transporting the game to the road, however, after it is killed and dressed out, may be a major undertaking.

Because of the size and weight of the game which is often hunted, and the rugged terrain over which it may be necessary to tow the game, a single person may find it extremely difficult to tow an animal along the ground. Furthermore, the animal will become dirty, battered, and torn as it is towed along. Rocks and other rough objects may tear or otherwise damage the skin.

This problem is well-known to hunters who frequent wilderness areas. The prior art discloses many methods of towing animals out of wilderness areas. Wampler (U.S. Pat. No. 2,592,771) discloses a towing harness for towing large game over the ground. Bauman (U.S. Pat. No. 3,996,228) discloses another towing harness for towing large game which also has general utility for pulling a sled, wagon or the like. Johnson (U.S. Pat. No. 3,038,644) discloses a simplified shoulder harness for towing a heavy game carcass, and Jehrke (U.S. Pat. No. 3,077,292) discloses yet another harness for dragging heavy loads, preferably game, such as deer or the like.

Keyser (U.S. Pat. No. 4,238,068) discloses a substantially flat sheet-like sled structure which can receive and support an animal carcass. The carcass may be tied into the somewhat flexible sled structure using a rope which passes through holes in the edges of the sled, thereby creating a zig-zag pattern around the animal carcass. Once the animal is tied into the sled, the sled structure supporting the carcass may be towed.

Alley et al. (U.S. Pat. No. 4,335,891) disclose a sled made out of a thin plastic sheet upon which an animal can be secured with straps. A harness may then be attached to the sled and the animal can then be transported by pulling the sled along the ground.

Both of the structures disclosed by Keyser and Alley et al. allow hunters to secure the carcass of a dead animal into the structure so that the carcass may be transported on the structure. However, these sled structures are rather large and add to the bulk which must be carried into hunting areas by the hunters. Even the somewhat flexible sled structure disclosed by Keyser will be difficult to carry in in spite of the fact that it may be rolled up into a cylindrical package having a length equal to the width of the sled structure. Also, because each of the semi-flexible sled structures disclosed by Keyser and Alley et al. possess a degree of rigidity, they are not easily packed among other material during preparation for a hunting trip. Instead each sled must be treated as an individual item, about which other items must be packed. Furthermore, because of this rigidity the sled structures do not slide easily around, over, or through immovable or hard to move objects such as trees, rocks, ridges, or the like which are found in rough wilderness terrain, because the rigidity inherent in these structures requires more than just the area of the structure which is impacted to move in response to the impact of an immovable object. The rigidity requires the entire structure to change position when a single portion of the structure must change position to get around or over such an object. This lack of complete flexibility can make it very difficult to tow the sled through areas crowded with immovable objects.

It will be appreciated from the foregoing that the prior art devices present problems which are in need of solutions. The present invention provides solutions for these and other problems.

SUMMARY OF THE INVENTION

In accordance with the present invention, an apparatus for reducing drag when sliding an animal headfirst along the ground with a pulling mechanism is provided. The animal has a neck and the pulling mechanism is attached to the animal such that he animal can be pulled headfirst along the ground. The apparatus comprises a wrapping mechanism for conforming to the shape of the animal. The wrapping mechanism includes a forward edge, a rearward edge, a forward body portion, a central body portion, and a rearward body portion. The forward edge has a substantially smaller lateral dimension than a lateral dimension of the central body portion. The forward body portion is interconnected to the rearward body portion by the central body portion. The forward edge further includes a first securing mechanism for securing the forward edge around the neck of the animal such that the forward edge remains secured around when the animal slides headfirst along the ground.

Preferably, the wrapping means includes a flexible sheet member and a second securing mechanism for securing the sheet member around the animal. The second securing mechanism preferably includes a pair of reinforced holes, preferably including grommets, in lateral edges of the flexible sheet member such that a securing device can be passed through the holes to secure the lateral edges together and to draw the flexible sheet member around the animal.

A method of towing a motionless animal is also provided. The method comprises the steps of attaching a handle mechanism to the animal such that the animal will slide headfirst when pulled with the handle mechanism; securing the animal in a drag reducing apparatus for receiving the animal to be towed and for conforming to the shape thereof; and pulling the animal with the handle mechanism such that the animal slides headfirst along the ground. The drag reducing apparatus includes a wrapping mechanism for conforming to the shape of the animal. The wrapping mechanism includes a flexible sheet member, a forward edge, a rearward edge, a forward body portion, a central body portion, a rearward body portion, and a first mechanism for securing the forward edge around the neck of the animal such that the forward edge remains secured around the neck of the animal when the animal slides headfirst along the ground. The forward edge has a substantially smaller lateral dimension than a lateral dimension of the central body portion, and the forward body portion is interconnected to the rearward body portion by a central body portion. The flexible sheet member conforms to the shape of the animal.

Preferably the drag reducing apparatus includes a pocket mechanism for receiving animal parts such as a heart, liver, or the like. Preferably, the drag reducing apparatus further includes a second mechanism for securing the flexible sheet member around the animal. This mechanism can include a pair of reinforced holes in lateral edges of the flexible sheet member, one of the holes being located in each lateral edge such that a securing device can be passed through the pair of reinforced holes to secure the lateral edges together and to draw the flexible sheet member around the animal.

The present invention provides hunters with an apparatus in which deer or other fallen game may be wrapped so that the game may be easily towed out of an inaccessible wilderness area. This apparatus is easily secured around the game so that the game is protected from rocks or other rough objects on the ground which might tear or otherwise damage the animal's skin. In addition, the covered areas of the animal are kept clean. This is particularly important because the chest cavity of the animal may be eviscerated soon after the animal is killed, thereby leaving the chest cavity, an internal portion of the animal, open to contamination by bacteria and other filth during the period of time when the animal is towed along the ground.

Other advantages of the present invention include the fact that the drag reducing apparatus of the present invention reduces the drag caused by the animal when it is towed over snow and ice, rough terrain, or open ground. Preferably, the drag reducing apparatus includes a flexible sheet having an exterior surface, which will slide over the ground, which includes a high density polymeric material, preferably high density polyethylene, which will slide easily over most surfaces. Furthermore, the present invention requires no pulling device which can tear away from the apparatus, such as the ropes disclosed by Keyser (U.S. Pat. No. 4,283,068) and Alley et al. (U.S. Pat. No. 4,335,891). Instead, the present invention is used to reduce drag and protect the animal from getting dirty or damage, while independent mechanisms are use to pull the animal. These mechanisms can be tied directly to the animal, thereby eliminating the possibility that the rope or pulling mechanism may tear away from the structure of the present invention when the animal is pulled.

Another advantage of the present invention is that it is extremely flexible and it may be folded up into a relatively light and a relatively small package which is easy to carry into a wilderness area. Preferably, the present invention may be packaged such that it may be carried in a coat pocket. Furthermore, the materials used to make the present invention are preferably inexpensive materials which allows the preferred embodiment of the present invention to be disposable such that its cost does not inhibit a user from throwing it away after a single use. This enables the user to avoid the need to clean the apparatus which is likely to be covered with blood and animal hair on one side and dirt on the other. In addition, some materials used to make preferred embodiments of the invention are extremely light, thereby allowing the apparatus to be extremely light and easy to carry when it is folded up into a small package.

The method of towing an animal with the present invention is extremely straight forward. A handle mechanism, preferably a rope or the like, is attached to the animal, preferably to the head or neck of the animal, or to a portion thereof (e.g. a portion of the head such as the animal's horns if the animal has horns), so that the animal can be towed headfirst when pulled with the handle mechanism. The animal is then secured in the drag reducing apparatus of the present invention, and subsequently pulled with the handle mechanism such that the animal slides headfirst along the ground. This method is easily explained and easily understood. Furthermore, the present invention allows the animal to be relatively easily secured in the drag reducing apparatus as compared to the mechanisms for securing animals in the prior art devices.

It will be appreciated that because the present invention conforms to the shape of the animal, and because freshly killed animals can be supple and relatively flexible, they can slide easily along the ground when secured in the present invention because the animal is allowed to conform to the terrain upon which it is sliding. Furthermore, the apparatus is not rigid and does not, therefore, have any hard, impact resisting surfaces which create drag when they impact upon immovable or hard to move objects such as rocks, trees, ridges, or the like. Because the present invention is not itself rigid, but extremely flexible instead, freshly killed animals can be towed through wilderness areas which are extremely crowded with immovable objects which would make it difficult to maneuver through the area with a semi-rigid or rigid sled structure similar to some of the prior art devices. In addition, the amount of flexible sheet material used to make the apparatus is minimized as much as possible, while still meeting the requirements for reducing drag for and protecting a particular type of game for which it is intended. This effort to minimize the amount of material helps to avoid snags on rocks, trees, and the like, when the animal is towed because there is little excess material to get caught on such rough objects. The present invention offers the further advantage that it has no inflexible surfaces or edges which create greater drag when sliding over rough terrain which has continually changing angles of incidence with respect to a flat and inflexible object. The present invention allows the animal, secured within to conform to the surface of the ground. This will provide for a maximum of contact between the ground and the drag reducing apparatus which will enable the apparatus to slide easily thereon. This is especially so in freshly fallen snow which is often present in the northern regions of the United States during the traditional hunting seasons generally set aside for deer hunting by the state governments in those regions. Yet another advantage of a preferred embodiment is its color, fluorescent orange, which conforms to that required for wearing apparel by many of those states, and allows hunters towing animals to be seen better by other hunters so as to avoid being shot at. It will be appreciated that this added safety precaution will be an advantage over use of the prior art devices.

As defined herein, a hole is an opening, and an animal may be any kind of game commonly hunted. An animal may also refer to an animal carcass which has been eviscerated or partially dismembered.

The above described features and advantages along with various other advantages and features of novelty are pointed out with particularity in the claims of the present application. However, for a better understanding of the invention, its advantages, and objects attained by its use, reference should be made to the drawings which form a further part of the present application and to the accompanying descriptive matter in which there is illustrated and described preferred embodiments of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENTS OF THE INVENTION

Figure 1:
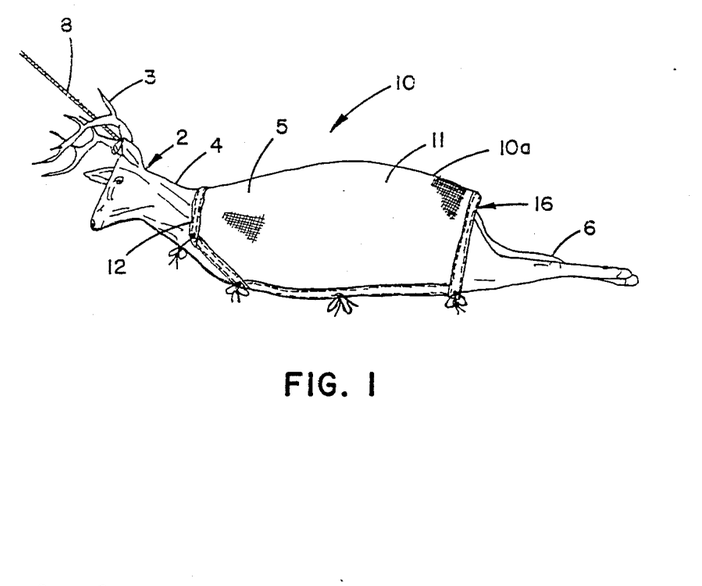
FIG. 1 is a top perspective view of a drag reducing apparatus in accordance with the present invention secured around a fallen deer.

Referring to the drawings, and initially to FIG. 1, the reference numeral 10 designates in a general way a drag reducing apparatus in accordance with the present invention. The drag reducing apparatus 10 can be easily secured around fallen game such as deer, antelope, elk, moose, goats, sheep, and the like, in order to reduce drag when the animal is pulled headfirst along the ground. In FIG. 1 a drag reducing apparatus 10 is secured around a fallen deer 2. A rope has been attached to the deer's antlers 3 so that the deer 2 may be pulled. It will be appreciated that the drag reducing apparatus 10 of the present invention, shown in FIG. 1, may be used to protect the deer 2 and to reduce drag when the deer 2 is pulled by any mechanism for pulling the deer 2 headfirst along the ground. Although not intending to limit the scope of the term "animal" herein, this term will be used interchangeably with the term "deer" to describe the deer shown in the drawings. In such cases the term "animal" will be followed by the reference numeral 2 which refers to the deer shown in drawings of the preferred embodiment. It will be appreciated that other embodiments of the present invention may be designed for animals other than deer.

Figure 2:
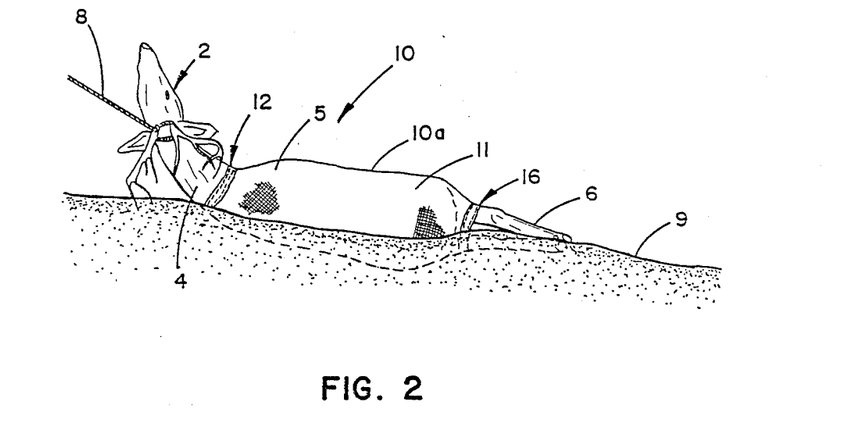
FIG. 2 is a side perspective view of a fallen deer, secured in a drag reducing apparatus in accordance with the present invention, being pulled through snow covered terrain.
Figure 3:
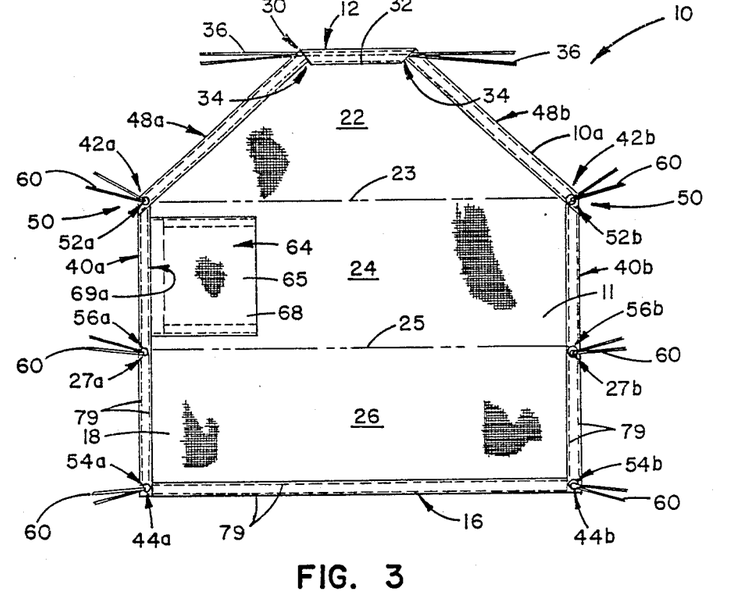
FIG. 3 is a plan view of a drag reducing apparatus in accordance with the present invention.
Figure 4:
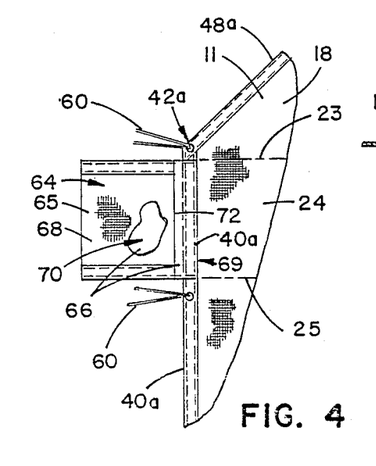
FIG. 4 is a plan view of a portion of the drag reducing apparatus of FIG. 3 including a lateral edge and a pocket device for receiving animal parts.
Figure 5:
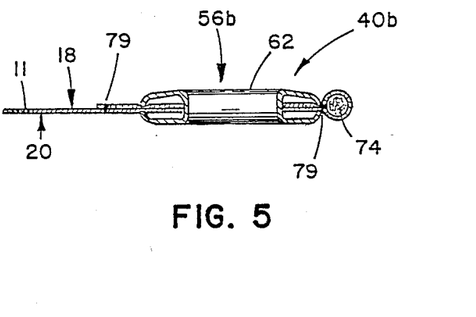
FIG. 5 is a cross-sectional view of a portion of the drag reducing apparatus shown in FIG. 3 taken through one of the grommets along one of the lateral edges.

Referring now also to FIG. 2, the drag reducing apparatus 10 of the present invention will conform to the shape of the fallen animal 2, preferably a deer 2, when it is secured around the animal 2. In FIG. 2, the deer's body or carcass 7 is allowed to make an impression in the snow-covered terrain 9 because the drag reducing apparatus 10 conforms to the shape of the deer's carcass 7. Referring now also to FIGS. 3–5, the drag reducing apparatus 10 includes a flexible sheet member 11 including a forward edge 12 which may be secured around the animal 2 using a first securing mechanism 30 which includes a neck cord 36, preferably two strands of twine, which may be tied around the animal's neck 4 to secure the forward edge 12 of the drag reducing apparatus 10 around the animal's neck 4. This mechanism 30 prevents the forward edge 12 from slipping down and over the animal's shoulders 5 because the neck cord 36 is tied around a portion of the neck 4 which has a smaller circumference than the animal's shoulders 5. Because the cord 36 is not expandable and cannot extend far enough to go around the larger circumference of the shoulders 5, once the cord 36 has been tied together around the smaller circumference of the neck 4, the cord 36 will not allow the forward edge 12 to slip down over the animal's shoulders 5. Therefore, when the animal 2 is secured in the drag reducing apparatus 10 and towed along the ground, as shown in FIGS. 1–2, the forward edge 12 remains secured around the animal's neck 4.

Referring now also to FIGS. 3, 4 and 5, the drag reducing apparatus 10 includes a wrapping mechanism 10a for conforming to the shape of the animal 2. The wrapping mechanism 10a includes the forward edge 12, a rearward edge 16, a forward body portion 22, a central body portion 24 and a rearward body portion 26. The forward body portion 22 is interconnected to the rearward body portion 26 by the central body portion 24. The forward edge 12 has a substantially smaller lateral dimension than the lateral dimension of the central body portion 24. The wrapping mechanism 10a further includes the first securing mechanism 30 for securing the forward edge 12 around the neck 4 of the animal 2 such that when the forward edge 12 is secured around the neck 4 of the animal 2, the forward edge 12 remains secured around the neck 4 when the animal 2 slides headfirst along the ground. The wrapping mechanism 10a preferably includes the flexible sheet member 11 and a second securing mechanism 50 for securing the flexible sheet member 11 around the animal 2.

The flexible sheet member 11 preferably has an interior surface 18 and an exterior surface 20. The sheet member 11 is preferably made of a flexible sheet material, preferably including natural fibrous material, synthetic polymeric material, or a combination thereof. In alternate embodiments the sheet member 11 may be a laminate, or a laminated sheet. The sheet material may include low density polymeric materials such as low density polyethylene and/or high density polymeric materials such as high density polyethylenes. Preferably, the sheet material includes a high density polymeric material possessing relatively good drag reducing characteristics, preferably a high density polyethylene. In alternate embodiments, this material can be concentrated on the exterior surface 20 of the drag reducing apparatus 10. A preferred material is a fibrous, high density polyethylene material which is spunbonded, such as a spunbonded olefin, preferably Tyvek ® spunbonded olefin from DuPont Company, Wilmington, DE. This material is extremely versatile, offering physical characteristics which combine properties of paper, film, and cloth. Tyvek ® is formed by a continuous process in which non-directional fibers are first spun and then bonded together by heat and pressure without the use of binders or fillers. Tyvek ® Type 10 Style 10850 is a most preferred material. Such a material is an extremely light material which means that the preferred apparatus 10 made from this material will be extremely light. Other polyethylene materials such as the various Rufco ® products manufactured by Raven Film Industries, Sioul Falls, SD, can also be used.

Preferably, the drag reducing apparatus 10 is flat and has six sides including the forward edge 12, the rearward edge 16, two lateral edges 40a and 40b and two oblique edges 48a and 48b which connect the lateral edges 40a and 40b to the forward edge 12. The lateral edges 40a and 40b are also connected to opposite ends of the rearward edge 16. The edges include reinforcing filaments 24 (see FIG. 5).

Each of the body portions 22, 24 and 26 occupy roughly one-third of the linear distance between the forward edge 12 and the rearward edge 16. The forward body portion 22 occupies the first one-third and is bounded by the forward edge 12, the two oblique edges 48a and 48b and a line 23 which could be drawn between forward ends 42a and 42b of the lateral edges 40a and 40b. Preferably, it has the shape of a trapezoid, most preferably a regular trapezoid wherein the angles of incidence of the oblique edges 48a and 48b mirror one another with respect to the parallel edges of the trapezoid. The central body portion 24 is bounded on one side by the line 23 between the forward ends 42a and 42b, where it interconnects with the forward body portion 22. The central body portion 24 also interconnects with the rearward body portion 26 on an opposite side bounded by a line 25 which could be drawn between two points 27a and 27b on opposite lateral edges 40a and 40b. Preferably, these points are equadistant from the forward ends 42a and 42b and rearward ends 44a and 44b. The boundaries of the central body portion 24 also include appropriate portions of the lateral edges 40a and 40b which interconnect the lines 23 and 25 between those edges 40a and 40b. The boundaries of the rearward body portion 26 include the line 25 and the rearward edge 16, as well as appropriate portions of the lateral edges 40a and 40b which interconnect the line 25 and the rearward edge 16. Preferably, the central body portion 24 and the rearward body portion 26 have the shape of a quadralateral plane, most preferably they are both rectangles, most preferably they are rectangles having substantially the same size and shape and together constitute two-thirds of the linear distance between the forward edge 12 and the rearward edge 16.

The size and shape of the drag reducing apparatus 10 of the present invention can be varied to suit the general size of a particular animal. For instance, a drag reducing apparatus 10 for securing around a deer 2 may have a considerably different size than a drag reducing apparatus 10 designed for use in towing elk, which are generally much bigger than deer. It is important that the forward edge 12 have a smaller lateral dimension than the central body portion 24 so that the forward edge 12 may be secured around the neck 4 of the animal 2 at the same time as the central body portion 24 and the rearward body portion 26 cover and protect the majority of the animal carcass 7. Preferably, the lateral dimension of the central body portion 24 is the same as the length of the line 23, the line 25, and/or the rearward edge 16. In order to secure the forward edge 12 around the neck 4, the forward edge 12 should be smaller than the neck 4 in order to allow the neck cord 36 to be tied around the neck 4 without gathering the forward edge 12 around the neck 4 so as to form creases or pleats in the material. At the same time, however, the other portions of the drag reducing apparatus 10 must be large enough to cover a sufficient portion of the animal's carcass 7 so that it is protected when sliding along the ground, and covered to prevent dirt and dust from getting into the animal's open chest cavity when the animal has been eviscerated. Preferably, the forward edge 12 is smaller than the circumference of the smallest neck 4 which can be anticipated for a particular use associated with a particular animal. For use towing deer, it is believed that this length is preferably about 12–20 inches (about 30–50 cm), more preferably about 14–18 inches (about 35–45 cm), even more preferably about 15–17 inches (about 38–43 cm). The width of the drag reducing apparatus 10 which is the distance between the lateral edges 40a and 40b, and the length of the drag reducing apparatus 10, which is the distance between the forward edge 12 and the rearward edge 16, will also vary depending on the general size of the animal for which the apparatus is intended. With respect to use for deer, the length is preferably about 4.5–7 feet (about 135–215 cm), more deer, the width is preferably about 4.5–6 feet, more preferably about 4.75–5.5 feet (about 145–170 cm). The most preferred embodiment of the drag reducing apparatus 10 of the present invention has a forward edge 12 of about 16 inches (about 40 cm) and an equal width and length of about 60 inches (about 152 cm). The forward body portion 22 has the shape of a regular trapezoid and occupies the first one-third of the distance between the forward edge 12 and the rearward edge 12. The central body portion 24 and the rearward body portion 26 have substantially identical rectangular shapes. It is within the scope of the present invention to expand any of the dimensions of these preferred embodiments to accommodate proportions of any animals which may be hunted or captured in any part of the world and under any circumstances, including stunning animals for towing to other areas, either by land, water, or airborne vehicles.

The first securing mechanism 30 preferably includes a flap 32 which is attached, preferably sewn, into the forward edge 12, thereby forming a cord channel 34 which runs the length of the forward edge 12. The cord channel 34 receives the neck cord 36 which is used to secure the forward edge 12 around the neck 4 of the animal 2. The neck cord 36 is preferably two strands of twine. It will be appreciated that many other securing mechanisms could be used to secure the forward edge 12 around the animal's neck 4. These mechanisms include but are not limited to straps having Velcro ™ attachments, buckles, snaps, or attachments, or cord devices or tying devices, rigid clamping devices or the like incorporated into the securing mechanism, preferably incorporated into the forward edge 12.

Preferably, the second securing mechanism 50 includes a pair of reinforced holes 52a and 52b in the lateral edges 40a and 40b, one of the pair of holes 52a and 52b being in each lateral edge 40a or 40b such that a securing device, such as a piece of twine 60, can be passed through the pair of reinforced holes 52a and 52b to secure the lateral edges 40a and 40b together and to draw the flexible sheet member 11 around the animal 2. Preferably, the lateral edges 40a and 40b each have a forward end 42a and 42b, a rearward end 44a and 44b, and a midsection 46a and 46b. The second securing mechanism 50 preferably includes a plurality of reinforced holes including forward holes 52a and 52b in the forward ends 42a and 42b, and rearward holes 54a and 54b in the rearward ends 44a and 44b of each of the lateral edges 40a and 40b. In this embodiment, the holes 52a and 52b in the forward ends 42a and 42b and the holes 54a and 54b in the rearward ends 44a and 44b may be respectively secured together to draw the flexible sheet member 11 around the animal 2. Preferably, there are midsection holes 56a and 56b in the midsections 46a and 46b of each lateral edge 40a and 40b such that there are three pairs of reinforced holes in the lateral edges 40a and 40b which can be respectively secured together, thereby drawing the flexible sheet member 11 around the animal 2. Preferably, these holes 46a and 56b are located equidistant from the forward ends 42a and 42b and the rearward ends 44a and 44b, and most preferably at opposite ends of the line 25 between points 27a and 27b on the lateral edges 40a and 40b.

Preferably, the reinforced holes are reinforced with a grommet 62 which may be made of any hard natural synthetic, preferably plastic material, or any metal material, which may be molded or deformed to form a grommet 62 protecting the edge of the reinforced holes. Preferably, the grommets 62 are made of a relatively soft deformable metal.

The materials used to make the drag reducing apparatus 10 of the present invention can be a natural fibrous material, a synthetic polymeric material, or a combination thereof. Preferably, these materials have characteristics which allow the apparatus 10 to provide reduced drag as compared to the deer itself. The material may be a laminated material having a variety of laminates which offer different desirable characteristics such as strength or slidability. Preferably, the exterior surface 20 of the apparatus includes polyethylene or an ethylene polymer including low density polyethylenes, high density polyethylenes, ultrahigh density polyethylenes, halogenated ethylene polymers such as tetrafluoroethylene polymer (Teflon ®), spunbonded olefins such as Tyvek ®, and the like. The material used may be a fibrous material which incorporates a polyethylene or a high density polyethylene into the material, thereby providing an exterior surface including polyethylene.

Preferably, the materials are so inexpensive that the apparatus 10 may be sold retail for an amount which is less than an amount a hunter would hold dearly, such that the hunter will not feel the apparatus cannot be disposed of after use due to its price. Because the materials are inexpensive, and because the costs of assembling and retailing the apparatus are so small, it will be appreciated that a new apparatus can be purchased each year without great expense to the buyer. Preferably, the apparatus 10 is designed to be disposable. Other embodiments may be developed which minimize costs in an effort to place the cost to the consumer at such a level that the consumer will use the apparatus 10 as a disposable item. This will eliminate the necessity of cleaning the apparatus 10 after use.

The materials which are used are also chosen so as not to add a great amount to the weight of the apparatus. Preferably, the apparatus 10 weighs less than about 2 pounds (908 grams), more preferably the apparatus weighs less than about 1 pound (454 grams). A preferred embodiment weighs about 14 ounces (322 grams). Efforts to minimize the weight offer the advantage of minimizing the weight which must be carried into the hunting area by the hunter as well as the weight which must be towed.

Furthermore, the drag reducing apparatus 10 preferably includes the color fluorescent orange so that this color, which is highly visable to humans but not to deer or other game, may be displayed in order to increase visability of hunters towing fallen game out of the hunting area. Preferably, the flexible sheet 11 is fluorescent orange. It will be appreciated that the apparatus 10 may be any color which is required by appropriate government authorities or by good common sense, in order to provide increased hunter safety.

Referring now to FIGS. 3 and 4, the preferred embodiment includes a pocket device 64 which is preferably sewn into the lateral edge 40a. Preferably, the pocket device 64 includes a pliable sheet 65 which is folded over so as to partially overlap itself, and sewn together on the overlapping edges 67a and 67b which overlap themselves. The pliable sheet 65 has an inside surface 66 which defines a pocket cavity 70 and is partially exposed at a top edge 69 where the sheet 65 does not overlap itself. The sheet 65 also has an outside surface 68. The top edge 69 is preferably sewn into the lateral edge 40a such that the inside surface 66 of the top edge 69 faces the interior surface 18 of the drag reducing apparatus 10. In order to put animal parts, such as an animal's heart, liver, or the like, into the pocket cavity 70, the pliable sheet 65 must be flipped out away from the central body portion 24 as shown in FIG. 4. In this way, the animal parts may be placed in the pocket cavity 70 by putting them through a pocket opening 72 to the pocket cavity 70 which would otherwise face the interior surface 18 of the drag reducing apparatus 10, and therefore, be difficult to access. The pocket device 64 can be attached virtually anywhere so long as it doesn't prevent the apparatus 10 from being secured around portions of the animal 2. Preferably, it is attached to one of the lateral edges 40a or 40b, most preferably it is attached to one of the lateral edges 40a or 40b at a point between the ends 42a and 44a such that the apparatus 10 can be easily folded immediately below the forward ends 42a and 42b without folding the pocket device 64.

Figure 6:
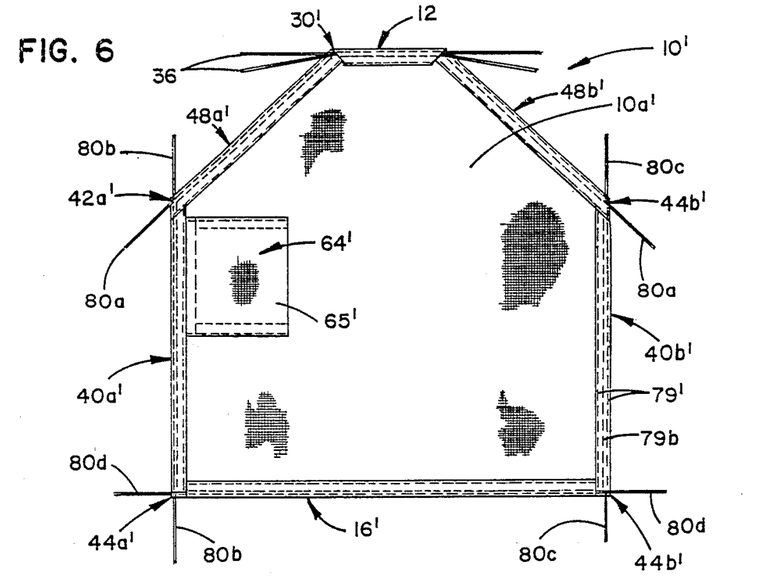
FIG. 6 is a plan view of an alternative embodiment of a drag reducing apparatus in accordance with the present invention.

In FIG. 6 an alternate embodiment of the drag reducing apparatus 10' of the present invention is shown wherein primed numerals designate corresponding elements of the previously disclosed embodiment. The alternate embodiment does not have reinforced holes in the lateral edges 40a' and 40b', but rather includes strands 80a, 80b, 80c and 80d which are sewn into the edges of the apparatus and allow the drag reducing apparatus 10' to be secured around the animal 2. One strand 80a passes from one forward end 42a', through the strand channel 82a in the oblique edges 48a' and 48b' and the forward edge 12', and emerges at the other forward end 42b'. Another strand 80b passes from the forward end 42a', through the lateral edge 40a', to the rearward end 44a'. Similarly, another strand 80c passes from the forward end 42b', through the lateral edge 40b', to the rearward end 44b'. A fourth strand 80d passes from the rearward end 44a', through the rearward edge 16', to the rearward end 44b'. The opposite ends of these strands are tied together lines may be used to secure the lateral edges 44a' and 44b' of the drag reducing apparatus 10' together around the animal 2 at the forward ends 42a' and 42b' and the rearward ends 44a' and 44b' respectively. Preferably, strands are sewn into the edges of the apparatus 10 after the reinforcing filament 74 is sewn into the edge. In such a case an extra thread 79b is required to enclose the strands in the edge. In a preferred embodiment, the strand 80a which passes through the forward edge 12 is not enclosed with an extra thread 79b, but passes through the cord channel 34 in common with the neck cord 36. Unlike the neck cord 36, however, the strand 80a passes into the oblique edges 48a and 48b at either end of the forward edge 12, rather than emerging from the ends of the cord channel 34 as the neck cord 36 does.

Figure 7:
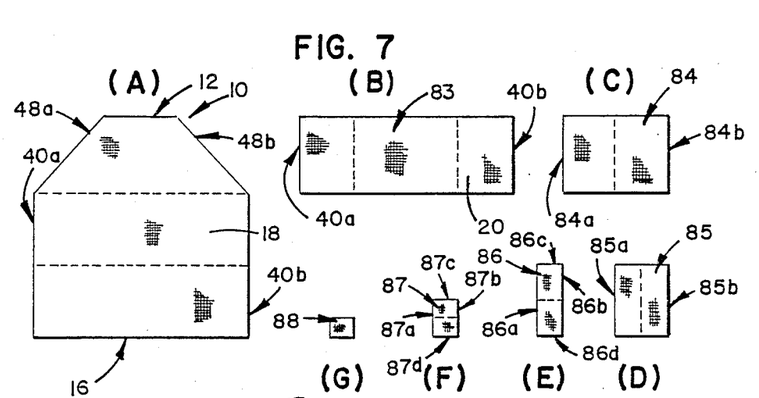
FIG. 7 schematically illustrates a sequence for folding a drag reducing apparatus (A)–(G)
Figure 8:
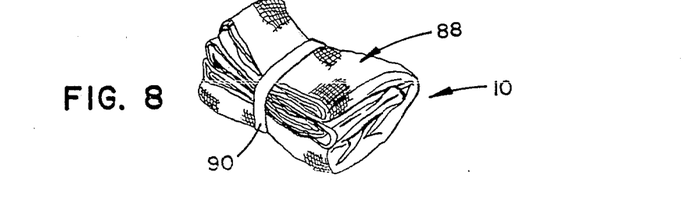
FIG. 8 is a perspective view of a drag reducing apparatus in accordance with the present invention which has been folded up, as shown in FIG. 7, so that it may be easily stored or transported.

Referring now to FIGS. 7 and 8, the drag reducing apparatus 10, which is shown schematically in FIG. 7 (A-G) may be folded at least six times, preferably at least seven times, more preferably eight times. The apparatus 10 may be folded any way which might suit a particular need. However, as shown in those figures, the forward edge 12 is folded in and the rearward end 16 is folded in so that the apparatus 10 is folded twice and overlaps itself twice. Although either surface 18 or 20 can be folded in, in the figure the interior surface 18 is folded in. A first quadralaterally shaped package 83 shown in FIG. 7(B), which results, is then folded a third and a forth time by folding the lateral edges 40a and 40b inward so that they meet in the center of a second quadralaterally shaped package 84 which is shown in FIG. 7(C). Longitudinal edges 84a and 84b of the second package 84 are then folded together resulting in a third quadralaterally shaped package 85 shown in FIG. 7(D). Longitudinal edges 85a and 85b of the third package 85 are then folded together resulting in a fourth quadralaterally shaped package 86 shown in FIG. 7(E). The fourth package is then folded so that the upper and lower edges 86c and 86d come together so as to result in a fifth package 87 shown in FIG. 7(F), which is in turn folded so that the upper and lower edges 87c and 87d come together to form a sixth package 88 which is shown in FIG. 7(G) and in FIG. 8. When the apparatus 10 assumes the folded position shown in FIG. 8, it has been folded eight times. When this package 88 is bound together by tape 90 as shown in FIG. 8, it preferably has rough dimensions of about 10 inches by 8 inches by 5 inches, more preferably about 8 inches by 6 inches by 4 inches. One preferred embodiment occupies a space of roughly about 8 inches by 5.5 inches by 3.5 inches when it is folded eight times in the manner depicted in FIG. 7 (A-G) and then bound together with tape 90 (as shown in FIG. 8) or straps, or placed in a container, such as a bag or pouch. Another preferred embodiment made of Tyvek ® Type 10 Style 1085D may be folded in this manner and may be placed in an envelope or other container, and thereby occupy a space of roughly about 8 inches by 5.5 inches by 1 inch. Alternatively, the preferred apparatus 10 may be folded over numerous times until it can be rolled into a small package which can easily fit into a small pouch or a pocket.

A method for towing an animal 2 comprises the steps of first attaching to the animal 2 a handle mechanism or a pulling mechanism such as rope, straps, bars, or the like which enable one to pull the animal 2. Second, the animal is secured in the drag reducing apparatus 10 of the present invention. The order of those two steps may be reversed and still be within the scope of the present invention as it makes no difference which of these steps precedes the other. Preferably, the animal is secured in the apparatus 10 by placing the animal in the open apparatus 10 so that the animal 2 is lying on the interior surface 18 with its neck 4 lying transversely across the forward edge 12. The forward edge 12 is then secured around the animal's neck 4 with any securing mechanism, preferably by tying the neck cord 36, desired herein, around the neck 4. Any mechanism for securing the forward edge 12 around the animal's neck 4 can be used. Preferably, the lateral edges 40a and 40b are also secured together, preferably by either tying together the opposite ends of the various strands (80a, 80b, 80c and 80d) of the alternate tying twine 60 together which is first passed through corresponding holes in the lateral edges 40a and 40b; e.g. preferably, 52a and 52b; more preferably, 52a and 52b, and 54a and 54b; even more preferably, 52a and 52b, 54a and 54b, and 56a and 56b. The mechanism for securing the lateral edges around the animal 2 such that it conforms to the animal's body 7 is not essential to the method because the animal 2 may be towed in the apparatus 10 so long as the forward edge 12 is secured around the animal's neck 4. The apparatus 10 will conform to the shape of the animal 2 because it is flexible and, therefore, conforms to the animal's shape as it find gravitational support or is pressed into the ground or snow cover.

The third step of the method includes pulling the animal 2 with the handle mechanism or pulling mechanism such that the animal 2 slide headfirst along the ground. The handle or pulling mechanism is preferably attached to the animal's 2 head, neck, or horns if any, or a combination thereof. Preferably, the method includes placing animal parts in a pocket device 64 prior to securing the animal 2 in the drag reducing apparatus 10. Although somewhat more difficult, this step can also be done after the animal 2 is secured. Preferably, the method also includes displaying the color of fluorescent orange of the most preferred embodiment of the drag reducing apparatus 10.

It will be appreciated that the animal 2 may be secured in the drag reducing apparatus 10 by simply securing the forward edge 12 around the animal's neck 4. Other measures need not be taken although they are preferable The most preferred embodiment of the drag reducing apparatus 10 of the present invention is designed to receive a North American white-tail deer. The apparatus 10 can, however, be designed to receive much smaller, and much bigger game, even very large game which could not be towed by a single person but might instead be towed by an all terrain vehicle such as any three or four wheeled all terrain motorized carrier.

While certain representative embodiments of the present invention have been described herein for the purposes of illustration, it will be apparent to those skilled in the art that modifications therein may be made without departing from the spirit and scope of the present invention.

In a preferred embodiment of the drag reducing apparatus 10 of the present invention, the apparatus 10 reduces drag over grass covered terrain at least about 20 per cent, preferably about 30 percent, and more preferably about 40 per cent in comparison with an uncovered North American White Tail deer.

What is claimed is:

1. An apparatus for reducing drag when sliding an animal head first along the ground with pulling means, the animal having a neck and head, and the pulling means attaching to the neck or the head of the animal such that the animal can be pulled head first along the ground, said apparatus comprising wrapping means for conforming to the shape of the animal, said wrapping means including a forward edge, a rearward edge, a forward body portion, a central body portion, and a rearward body portion, said forward edge having a substantially smaller lateral dimension than a lateral dimension of the central body portion; said forward body portion being interconnected to said rearward body portion by said central body portion; said forward edge including first securing means for securing said forward edge around the neck of the animal such that said forward edge remains secured when the animal slides head first along the ground, said first securing means being a part of said forward edge, said first securing means being separate from said pulling means.

2. The drag reducing apparatus of claim 1, said wrapping means including a flexible sheet member and second securing means for securing said flexible sheet member around the animal.

3. The drag reducing apparatus of claim 2, said flexible sheet member including lateral edges, said second securing means including a pair of reinforced holes in said lateral edges, one of said pair of holes being in each of said lateral edges, such that a securing device can be passed through said pair of reinforced holes to secure the lateral edges together and to draw the flexible sheet member around the animal.

4. The drag reducing apparatus of claim 3, each of said reinforced holes including a grommet, whereby said grommet provides reinforcement of said hole.

5. The drag reducing apparatus of claim 3, said lateral edges each having a forward end, a rearward end, and a midsection; said second securing means including a plurality of reinforced holes, said plurality of reinforced holes including a forward hole in the forward ends, and a rearward hole in the rearward ends, of each of said lateral edges; wherein the holes in the forward ends and the holes in the rearward ends may be respectively secured together to draw the flexible sheet around the animal.

6. The drag reducing apparatus of claim 5, said plurality of reinforced holes including midsection holes in the midsection of each of said lateral edges, such that there are three pairs of reinforced holes in said lateral edges which can be respectively secured together, thereby drawing the flexible sheet around the animal.

7. The drag reducing apparatus of claim 1, said first securing means including a cord for tying around the neck of the animal, said forward edge including casing means for receiving said cord, said cord passing entirely through the length of said casing means.

8. The drag reducing apparatus of claim 2, said flexible sheet member including a material selected from the group consisting of synthetic polymeric materials, natural fibrous materials, and combinations thereof.

9. The drag reducing apparatus of claim 8, said flexible sheet member including a synthetic polymeric material selected from the group consisting of high density polyethylenes and low density polyethylenes.

10. The drag reducing device of claim 9, said flexible sheet member being made of high density polyethylene.

11. The drag reducing apparatus of claim 8, said flexible sheet member being made of a spunbonded olefin.

12. The drag reducing apparatus of claim 9, said apparatus having an exterior surface including a high density polyethylene material which provides enhanced slidability.

13. The drag reducing device of claim 2, said flexible sheet member including a series of interconnecting edges, said interconnecting edges being reinforced.

14. The drag reducing apparatus of claim 1 having a color which is easy to see from a distance thereby providing for increased hunter safety.

15. The drag reducing apparatus of claim 14, substantially having the color of fluorescent orange.

16. The drag reducing apparatus of claim 1 including pocket means for receiving animal parts.

17. The drag reducing device of claim 3 including pocket means for receiving animal parts, said pocket means including a pliable sheet having inside and outside surfaces, said pliable sheet being folded so as to partially overlap itself so as to have a top edge which is not overlapped and two edges which overlap themselves, said overlapping edges being sewn together such that said inside surface defines a pocket cavity, and the top edge of the pliable sheet being sewn into one of said lateral edges such that said inside surface near the top edge faces an interior surface of said flexible sheet member.

18. The drag reducing apparatus of claim 1 wherein said apparatus is foldable such that it may be folded at least about six times such that it will occupy a smaller area when stored.

19. The drag reducing apparatus of claim 1 wherein said apparatus weighs less than about two pounds (about 908 grams).

20. The drag reducing apparatus of claim 1 wherein said forward edge has a length of about 14–18 inches (about 35–45 cm).

21. A method of towing an animal, the animal having a neck and a head, said method comprising the steps of:
(a) attaching handle means to the head or the neck of the animal such that the animal will slide headfirst when pulled with said handle means;
(b) securing the animal in a drag reducing apparatus said drag reducing apparatus including wrapping means for conforming to the shape of the animal, said wrapping means including a flexible sheet member, a forward edge, a rearward edge, a forward body portion, a central body portion, a rearward body portion, and first means for securing said forward edge around the neck of the animal such that the forward edge remains secured around the neck of the animal when the animal slides headfirst along the ground, said forward edge having a substantially smaller lateral dimension than a lateral dimension of the central body portion, said forward body portion being interconnected to said rearward body portion by said central body portion, said flexible sheet member conforming to the shape of the animal, said securing step including securing said first means for securing around the neck of the animal independent of said handle means; and
(c) pulling the animal with said handle means such that the animal slides headfirst along the ground.

22. The method of towing an animal in accordance with claim 21, said drag reducing apparatus including pocket means for receiving animal parts; said method including placing animal parts in said pocket means prior to securing the animal in the drag reducing apparatus.

23. The method of towing an animal in accordance with claim 21, said drag reducing apparatus further including second means for securing said flexible sheet member around the animal.

24. The method of towing an animal in accordance with claim 23, said flexible sheet member having lateral edges, said second securing means including a pair of reinforced holes in said lateral edges, one of said pair of holes being in each of said lateral edges, such that a securing device can be passed through said pair of reinforced holes to secure the lateral edges together and to draw the flexible sheet member around the animal.

25. The method of towing an animal in accordance with claim 21, said first securing means including a cord for tying around the neck of the animal, said forward edge including casing means for receiving said cord, said cord passing entirely through the length of said casing and, said step of securing the animal in said drag reducing apparatus including tying said cord around the neck of the animal such that the forward edge of said flexible sheet is secured around the neck of the animal, and such that the forward edge remains secured around the neck of the animal when the animal slides headfirst along the ground.

26. The method of towing an animal in accordance with claim 21, said method further including providing an apparatus having a color which is easily seen from a distance, thereby providing for increased hunter safety.

27. The method of towing an animal in accordance with claim 26, said apparatus including a color of fluorescent orange, said method further including displaying the color fluorescent orange.

28. The method of towing an animal in accordance with claim 21 wherein said animal is a deer, and where said forward edge has a length of about 14–18 inches (about 35–45 cm).

* * * * *